Dec. 19, 1961 W. E. COLEMAN 3,013,459
CONTROL SYSTEM FOR ROLLER CONVEYOR
Filed March 12, 1959
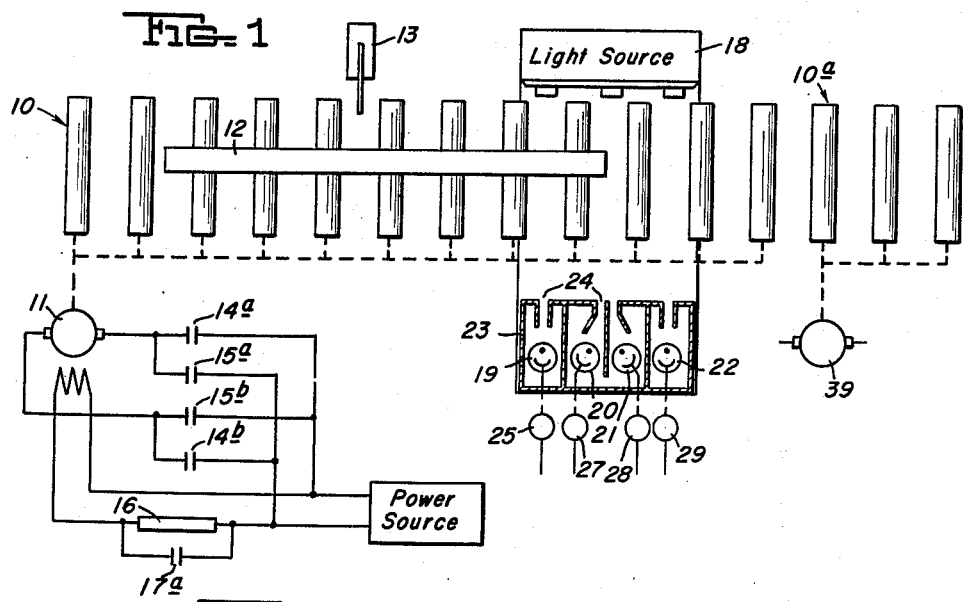
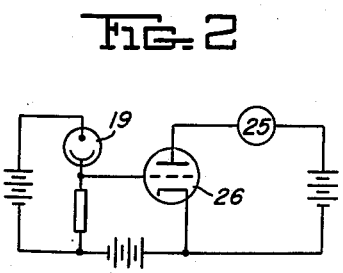
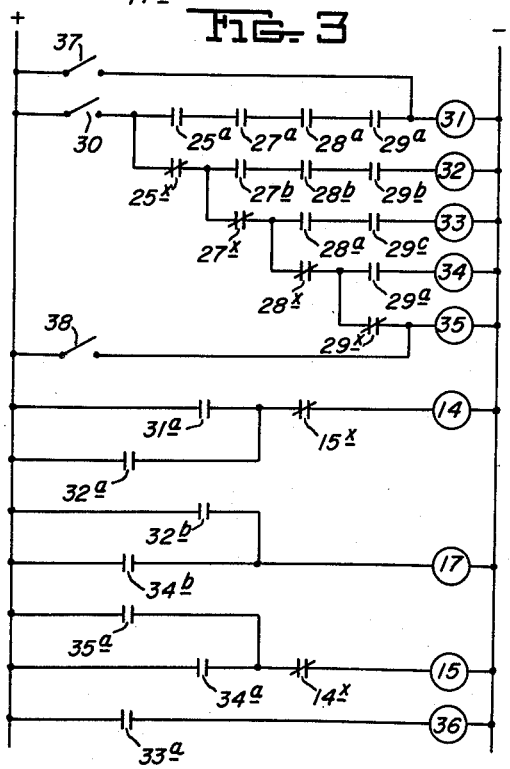
INVENTOR
WILLIAM E. COLEMAN
By Donald G. Dalton
Attorney 3,013,459
CONTROL SYSTEM FOR ROLLER CONVEYOR
William E. Coleman, Monroeville, Pa., assignor to United
States Steel Corporation, a corporation of New Jersey
Filed Mar. 12, 1959, Ser. No. 798,988
1 Claim. (Cl. 83—210)

This invention relates to means for accurately positioning an elongated product on a roller conveyor for a finishing operation such as cutting to length and, in particular, to a system for positioning a rolled section in relation to a cut-off saw or torch to insure cutting the desired finished length.

Rolled sections are ordinarily positioned on roller conveyors by mechanical stops for cutting to length by movable saws. Such an arrangement is incapable of cutting the product accurately because of the variable rebound of the section from the stop. I have invented a system for controlling the conveyor so as to position accurately the piece to be cut, without the necessity of any mechanical contact therewith. In a preferred embodiment, I establish a plurality of parallel light beams across the conveyor at closely adjacent points, adapted to be successively interrupted by a length of rolled section advancing therealong. Photocells energized by the beams are employed to control the conveyor motor to halt the section in accurate relation to a cut-off saw.

A complete understanding of the invention may be obtained from the following detailed description and explanation which refer to the accompanying drawings illustrating the present preferred embodiment. In the drawings:

FIGURE 1 is a diagrammatic layout showing the conveyor, its motor and the saw;

FIGURE 2 is a typical photocell circuit; and

FIGURE 3 is a complete diagram of the circuit by which the photocells control the conveyor motor.

Referring now in detail to the drawings and, for the present, particularly to FIGURE 1, a roller conveyor 10 driven by a motor 11 is adapted to receive a rolled section such as beam 12 from the delivery conveyor (not shown) of a rolling mill. A saw or torch 13 of any desired type is movable into and away from cutting engagement with the beam when properly positioned on the conveyor. Forward and reverse contactors 14 and 15 (see FIGURE 3) have contacts 14a, 14b and 15a, 15b in the armature circuit of motor 11. The field-winding circuit of the motor includes a resistor 16. A relay 17 has contact 17a effective to shunt resistor 16.

A light source 18 on one side of conveyor 10 projects light beams onto photocells 19, 20, 21 and 22 enclosed in a housing 23 provided with narrow collimating slits 24. The light source and photocells are mounted so the beams from the former to the latter will be cut off successively by the beam as it advances along the conveyor. Each photocell controls a relay by means of a conventional circuit shown in FIGURE 2. As there shown, cell 19 cotnrols relay 25 through an amplifier 26. Similarly, cells 20, 21 and 22 control relays 27, 28 and 29. These relays, shown in FIGURE 1, adjacent the photocells, respectively, actuate contacts designated by the same numerals with the suffix, "a," "b," "x," etc. As will be evident, the circuit of FIGURE 2 is such that when cell 19 is illuminated and conducting, the negative bias normally applied to the grid of triode 26 is removed and current flows in the output circuit thereof to energize relay 25.

Under normal conditions, with no beam on the conveyor, all the photocells are illuminated and all relays 25, 27, 28 and 29 are energized. The operator then closes manual switch 30. This closes a circuit for a relay 31 through front contacts 25a, 27a, 28a and 29a. Relay 31 thereupon closes its front contacts 31a energizing contactor 14. The latter then closes its contacts 14a and 14b and starts motor 11. Thus, when a beam is delivered from the mill to conveyor 10, it is immediately advanced to position for cutting to length.

As the beam 12 approaches cutting position, its leading end interrupts the light falling on cell 19, deneergizing it and relay 25. This relay opens its front contact 25a and closes its back contact 25x, deenergizing relay 31 and energizing a relay 32 through front contacts 27b, 28b and 29b of relays 27, 28 and 29 which remain energized. Although contact 31a opens, relay 14 remains energized because relay 32 closes a contact 32a in parallel with contact 31a. Relay 32 also closes a contact 32b which energizes relay 17. Relay 17 closes its contact 17a to shunt the field resistor 16 and thus slows down motor 11 to minimum speed.

Beam 12 continues to advance until it interrupts the beam directed onto photocell 20, deenergizing relay 27. This relay opens its contact 27b deenergizing relay 32. Relay 32 opens its contact 32a deenergizing contactor 14. The latter opens its contacts 14a and 14b thus stopping motor 11. The deenergization of relay 27 also closes a back contact 27x which completes a circuit for a relay 33. Relay 33, by its contact 33a, controls a contactor 36. This contactor sets into operation saw 13 and its feed whereby the length of beam 12 beyond the saw is cut off. The saw feed automatically returns the saw to out-of-the-way position when the cut is complete. Relay 33 is preferably slow to respond so that the saw will not be fed forward until beam 12 has stopped moving.

The cycle described above is the normal operation of the system. I also provide means to correct abnormal operation. If beam 12 should advance too far beyond the correct cutting position, for example, it will cause cell 21 and relay 28 to be deenergized, thus opening contact 28a and closing contact 28x. The opening of contact 28a prevents the energization of relay 33 as previously described. The closing of contact 28x energizes a relay 34 through contact 29a of relay 29. Relay 34 closes its contacts 34a and 34b. The closing of contact 34a energizes contactor 15 and the closing of contact 34b energizes relay 17. Thus motor 11 is operated in reverse direction at minimum speed until cell 21 is again energized. Energization of relay 28 which results opens contact 28x deenergizing relay 34 which in turn opens contacts 34a and 34b. This stops motor 11 and the closing of contact 28a energizes relay 33 to operate saw 13.

If the initial forward speed of beam 12 should be so great that it would coast far enough to cut off light to cell 22, relay 29 would be deenergized, opening contact 29a and closing contact 29x. The closing of contact 29x energizes relay 35. Relay 35 closes contact 35a which energizes contactor 15 without energizing relay 17. This causes motor 11 to run in reverse direction at maximum speed until cell 29 is again energized whereupon relay 17 is energized to slow the motor to minimum speed. Motor 11 is then stopped as described above when cell 28 is again energized.

Manual switches 37 and 38 are provided, by-passing the photocell controls, for operation of motor 11 at maximum speed, forward and reverse, as desired, regardless of the condition of the photocell. Switch 37 permits a length which has been cut off to be fed along conveyor 10 under manual control to a terminal section 10a thereof which is constantly driven by a motor 39 at a speed greater than conveyor 10. As soon as the cut-off length has been thus disposed of, opening of switch 37 again places the system under control of the photocells so that as the freshly cut end of the beam reaches the proper point for the next cut, it will be accurately arrested in exact position, as already described. Interlocking back contacts 15x on contactor 15 and 14x on contactor 14 are connected in the circuits of the other of the two contactors, respectively, to prevent simultaneous operation of both.

It will be apparent from the foregoing that the invention provides a system which is effective automatically to position a rolled section accurately for hot-sawing to a predetermined length. The controlling length is the distance between the saw and a point between photocells 20 and 21. Any suitable means may be utilized to permit varying this length, such as adjustable mountings for light source 18 and photocell housing 23.

Although I have disclosed herein the preferred embodiment of my invention, I intend to cover as well any change or modification therein which may be made without departing from the spirit and scope of the invention.

I claim:

Workpiece-positioning apparatus including a roller conveyor for moving an elongated workpiece past a machine adapted to operate thereon and a motor for driving said conveyor, the combination therewith of a control system for said motor comprising forward and reverse contactors and speed-reduction means connected to said motor, four photo-cells on one side of the conveyor, a light source on the other side adapted to illuminate said cells until the illumination of the cells is cut off successively by the advancing workpiece, relay means energized when all cells are illuminated for closing said forward contactor, relay means energized when only the last three cells are illuminated rendering said speed-reduction means effective, relay means energized when only the last two cells are illuminated for opening both contactors and setting said machine into operation, relay means energized when only the last cell is illuminated for closing said reverse contactor and rendering said speed-reduction means effective, and relay means energized when no cell is illuminated to close said reverse contactor.

References Cited in the file of this patent

UNITED STATES PATENTS

| | | |
|---|---|---|
| 2,490,256 | Crane | Dec. 6, 1949 |
| 2,618,047 | Mansell | Nov. 18, 1952 |
| 2,621,106 | Abbey | Dec. 9, 1952 |
| 2,738,007 | Power et al. | Mar. 13, 1956 |